United States Patent [19]

Kage

[11] Patent Number: 4,680,772
[45] Date of Patent: Jul. 14, 1987

[54] DIGITAL SIGNAL REPEATER INCLUDING MEANS FOR CONTROLLING A TRANSMITTER

[75] Inventor: Kouzou Kage, Tokyo, Japan

[73] Assignee: NEC Corporation, Japan

[21] Appl. No.: 766,262

[22] Filed: Aug. 16, 1985

[30] Foreign Application Priority Data

Aug. 25, 1984 [JP] Japan .................................. 59-175844

[51] Int. Cl.$^4$ .............................................. H04B 7/17
[52] U.S. Cl. ...................................... 375/4; 178/70 R; 375/106
[58] Field of Search ................. 375/3, 4, 10, 106, 108; 178/69 R, 70 R, 70 S; 455/8, 9, 10, 67; 370/13; 371/22, 48, 61; 364/514; 340/825.06, 825.16, 825.14

[56] References Cited

U.S. PATENT DOCUMENTS

| | | | |
|---|---|---|---|
| 3,045,185 | 7/1962 | Mathwich | 455/8 |
| 3,110,768 | 11/1963 | Pustelnyk | 375/4 |
| 3,383,465 | 5/1968 | Wilson | 178/70 R |
| 4,327,356 | 4/1982 | Gilliland | 375/4 |

OTHER PUBLICATIONS

W. R. Bonnett, "Statistics of Regenerative Digital Transmission", The Bell System Technical Journal, pp. 1501-1542, Nov. 1958.

F. M. Gardner, "Phaselock Techniques", pp. 117-119, John Wiley & Sons, Inc., 1966.

Primary Examiner—Benedict V. Safourek
Attorney, Agent, or Firm—Ostrolenk, Faber, Gerb & Soffen

[57] ABSTRACT

A digital signal repeater system, including means for controlling the transmitter of the system. The system is substantially immune to fading, interference and noise, and rapidly detects the reception of a digital signal. A first level detector outputs a logical 1 signal to indicate reception of a signal, in response to the level of the IF signal in the receiver. A second level detector indicates when the received signal is digital by filtering the demodulated received signal and generating a logical 1 output when the received signal has a substantial component at a predetermined clock frequency. The two logical output signals are applied to an AND gate and the output is smoothed and compared by a comparator to a reference level. The output of the comparator is used to control the transmitter. In another embodiment, a third level detection circuit determines whether the clock frequency signal has been detected for a comparatively long period of time and, if so, lowers the reference level supplied to the comparator to stabilize its output.

22 Claims, 11 Drawing Figures $1F$ $x_8$    $V_{C1}$ $x_3$ $x_{11}$ $x_{12}$    $V_{C2}$ $x_4$ $x_5$ $x_6$    $V_{C3}$ $x_7$

DIGITAL SIGNAL REPEATER INCLUDING MEANS FOR CONTROLLING A TRANSMITTER

BACKGROUND OF THE INVENTION

The present invention relates to a digital signal repeater for repeating digital signals and, more particularly, to a repeater of the type including a controller for controlling the activation of a radio transmitter.

A repeater of the type described generally includes a radio receiver, a radio transmitter, and a controller. The receiver receives a modulated wave which has been transmitted from a terminal station or the like and demodulates the wave to provide a digital signal. The transmitter retransforms the digital signal into a modulated wave which is sent to another terminal station or the like. The controller controls the operation of the transmitter such that: (1) while a modulated wave is being received, the transmitter is activated (turned on) and retransmits (repeats) the modulated wave; and (2) while a modulated wave is not being received, the transmitter is not activated (turned off) so as not to retransmit a modulated wave. Whether or not a modulated wave has been received may be determined by detecting the level of a modulated wave in the intermediate frequency (IF) band of the receiver.

However, this approach has the drawback that the IF band modulated wave level sometimes reaches a sufficient value in response to the reception of an interference wave from another system is (rather than the modulated wave itself), thereby undesirably activating the transmitter to repeat the interference signals.

SUMMARY OF THE INVENTION

It is therefore an object of the present invention to provide a digital signal repeater having an improved controller which is free from the above-described drawback.

In accordance with the present invention, there is provided a digital signal repeater having a receiver for receiving a modulated carrier wave and demodulating a digital signal, a transmitter for transmitting a carrier wave modulated by the digital signal, and a controller responsive to the output of the receiver for providing a control signal controlling the transmitting operation of the transmitter. The controller preferably comprises first decision means for detecting the level of the modulated carrier wave of an intermediate frequency band of the receiver and providing a first signal, second decision means for detecting a clock frequency component in the output of the receiver and providing a second signal, logic means responsive to the first and second signals for providing a third signal, first smoothing means for smoothing the third signal, and comparator means for comparing the output of the first means with a reference level and providing the control signal.

BRIEF DESCRIPTION OF THE DRAWINGS

The above and other objects, features and advantages of the present invention will become more apparent from the following detailed description taken with the accompanying drawings in which.

DETAILED DESCRIPTION OF THE INVENTION

Figure 1:
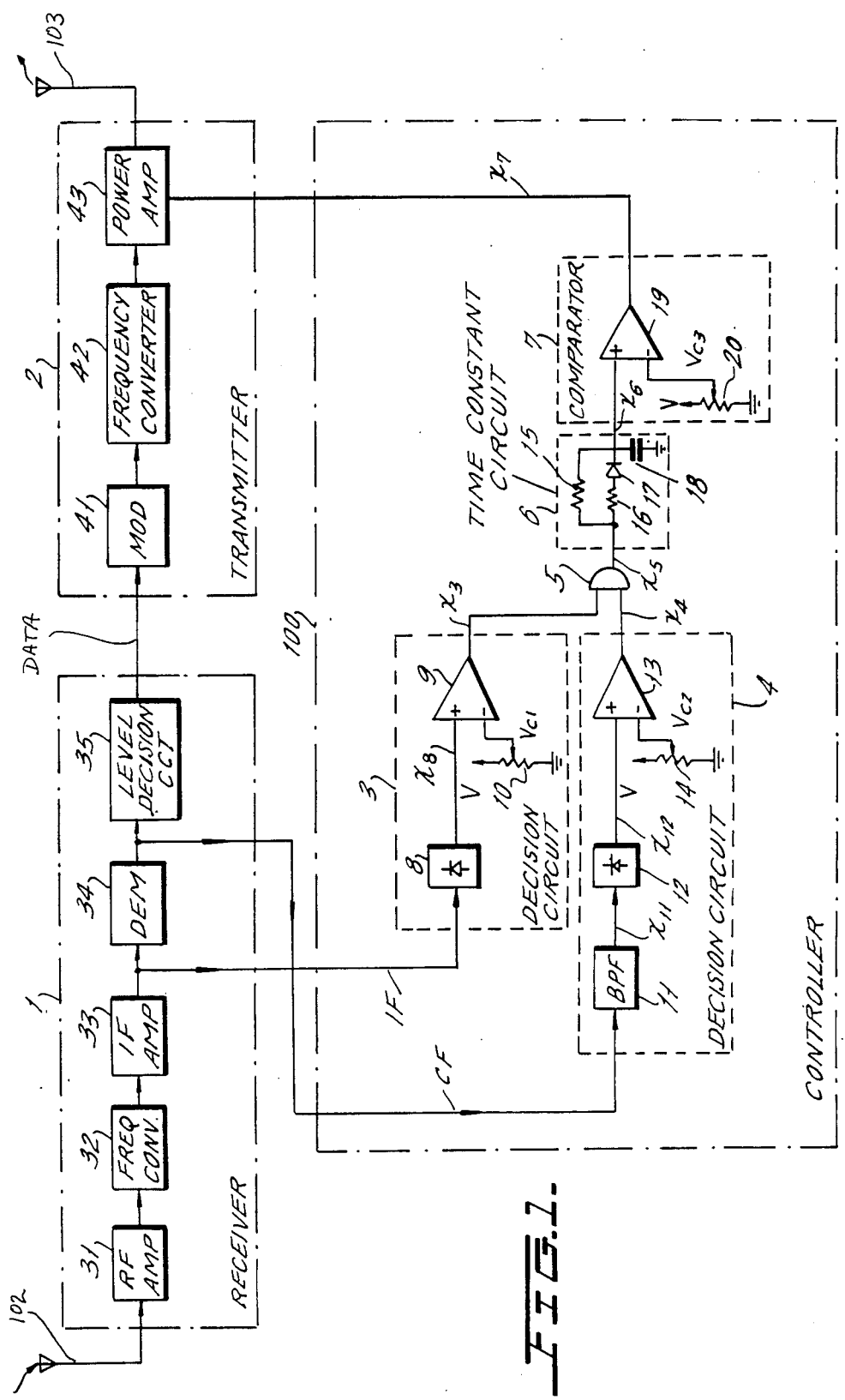
FIG. 1 is a circuit diagram showing a first embodiment of a digital signal repeater in accordance with the present invention.

Referring to FIG. 1 of the drawings, a digital signal repeater embodying the present invention is shown and generally comprises a receiver 1, a transmitter 2, and a controller 100. A carrier wave which has been modulated by a digital signal is received by an antenna 102 and is applied to and amplified by a radio frequency (RF) amplifier 31 which is included in the receiver 1. The output of the RF amplifier 31 is converted by a frequency converter 32 to a modulated intermediate frequency (IF) signal and, then, amplified by an IF amplifier 33. The modulated IF signal is demodulated by a demodulator 34 and, then, transformed into a digital signal (DATA) by level decision circuit 35.

In the transmitter 2, a modulator 41 modulates a carrier wave as a function of the digital signal (DATA) and applies its output to a frequency converter 42 which converts the output of modulator 41 to the RF band. The modulated wave in the RF band is transmitted via a power amplifier 43 and an antenna 103 to a terminal station or another repeater (not shown) which follows the illustrated repeater.

The transmission control over the power amplifier 43 is performed by the controller 100 as will be described in detail hereinafter.

Figure 2A:
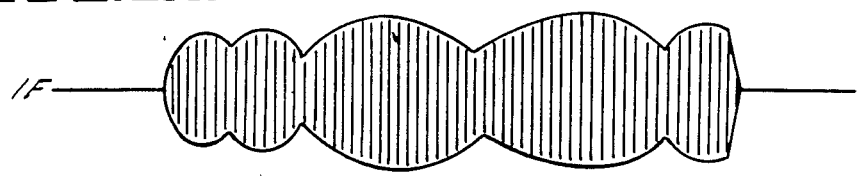
FIGS. 2A–2I are timing charts representative of the operation of the repeater shown in FIG. 1.
Figure 2B:
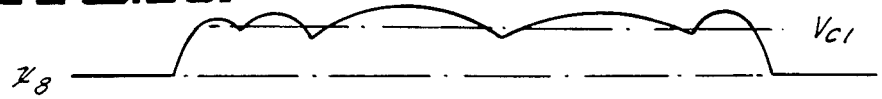
Figure 2C:

The controller 100 comprises a first decision circuit 3, a second decision circuit 4, an AND gate 5, a time constant circuit 6, and a comparison circuit 7. The first decision circuit 3 is adapted to detect the level of the modulated IF signal appearing at the output of the IF amplifier 33 so as to determine whether or not the receiver 1 is receiving a signal and, for this purpose, it comprises a level detector 8, a comparator or differential amplifier 9, and a potentiometer 10. In the example shown in FIG. 2A, the modulated IF signal has undergone level fluctuation due to fading as is experienced by radio signals. The level detector 8 is adapted to detect the envelope of the modulated IF signal. As shown in FIG. 2B, the output $x_8$ of the level detector 8 appears as an envelope. The comparator 9 compares the detector output $x_8$ with a reference voltage $V_{C1}$ which is determined by the potentiometer 10 and, if the former is higher than the latter, produces an output $x_3$ indicating that the receiver 1 is receiving a signal. The comparator output $x_3$ is delivered to the AND gate 5 as an output of the first decision circuit 3 (FIG. 2C).

The second decision circuit 4 is made up of a bandpass filter 11, a level detector 12, a comparator or differential amplifier 13, and a potentiometer 14. The function of the decision circuit 4 is detecting the level of a recovered clock frequency component which is synchronous with the received signal in order to determine whether the signal the receiver 1 is receiving is a digital signal. A signal CF, which contains a clock frequency component obtained by full-wave rectification of the output of the demodulator 34, is applied to the input terminal of the decision circuit 4.

Figure 2D:
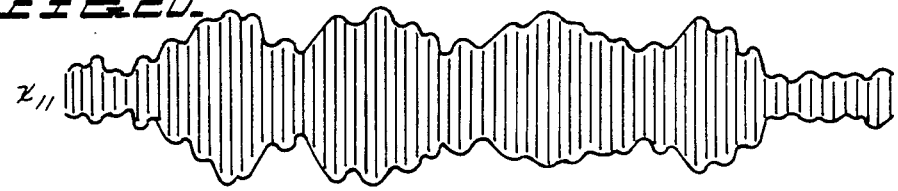

The bandpass filter 11 separates the clock frequency component from the input signal CF of the decision circuit 4, thereby producing an output signal $x_{11}$ as shown in FIG. 2D. Comparing FIGS. 2A and 2D, it will be seen that the signal $x_{11}$ appears as noise so long as the receiver 1 does not receive a signal and, hence, the bandpass filter 11 outputs a clock frequency component which is contained in the noise. As the receiver 1 receives a modulated signal, the signal $x_{11}$ greatly fluctuates because the clock frequency is significantly lower than the intermediate frequency and because the clock frequency component is affected by a code pattern of information which is being transmitted.

Figure 2E:
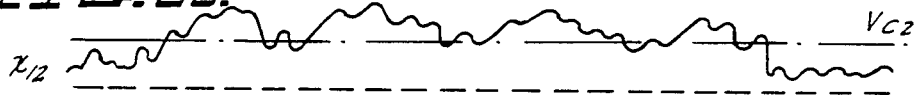
Figure 2F:

The level detector 12 detects a level of the signal $x_{11}$ to deliver an output $x_{12}$. As shown in FIG. 2E, the detector output $x_{12}$ appears as an envelope. The comparator 13 compares the signal $x_{12}$ with a reference voltage $V_{C2}$ which is determined by the potentiometer 14 and, if the former is higher than the latter, produces an output $x_4$ (FIG. 2F) as an output of the decision circuit 4, showing that the receiver 1 is receiving a digital signal.

The output $x_3$ of the decision circuit 3, which indicates whether or not a received intermediate frequency is present, rises even when interference waves such as those attributable to adjacent channels are received, if the interference waves are sufficient in level. Therefore, should the transmitter 2 (i.e., the power amplifier 43) be activated by the output $x_3$ of the decision circuit 3 only, erroneous repeating would result.

Although the transmitter 2 may be activated by directly using the output $x_4$ of the decision circuit 4 only, such an approach also involes the risk of erroneous repeating considering the fact that the clock frequency contained in the noise waveform sometimes reaches a sufficient level even if the receiver is not receiving a signal.

The shortcoming of the decision circuits 3 and 4 as discussed above is significantly reduced by gating the output $x_3$ of the decision circuit 3 and the output $x_4$ of the decision circuit 4 in AND gate 5 and applying the gated signal to the time constant circuit 6. Specifically, when the output $x_3$ of the decision circuit 3 has built up in response to an interference wave as derived from an another system or from adjacent channel, the output of the AND gate 5 does not rise (i.e., does not switch to a logical "1") because the clock frequency component cannot rise to a sufficient level. When the output $x_4$ of the decision circuit 4 has risen in response to noise in a non-receiving condition of the receiver 1, it is not reflected by the output $x_5$ of the AND gate 5 because the output of the decision circuit 3 still remains logical "0".

Figure 2G:
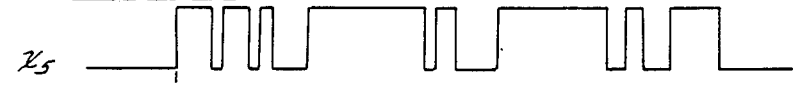

The output $x_5$ of the AND gate 5 (FIG. 2G) is applied to the time constant circuit 6. As shown, the time constant circuit 6 comprises an RC circuit made up of a resistor 15 and a capacitor 18 and, in addition, a series connection of a resistor 16 and a diode 17 which is connected in parallel with the resistor 15, thereby attaining a fast rise response and a slow fall response. Such a response characteristic of the time constant circuit 6 not only allows the response at the start of signal reception to be fast but also substantially eliminates the influence of the logical "0" level of the output $x_5$ of the AND gate 5 which may occur momentarily when the level of the modulated wave IF has lowered due to fading, or when the clock component of the input CF to the decision circuit 4 has decreased in response to a code pattern in the received information.

Figure 2H:
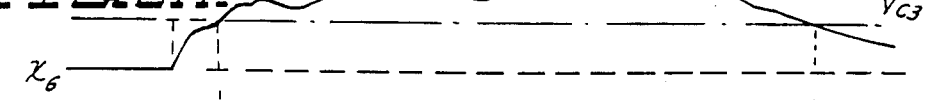
Figure 2I:

The output $x_6$ of the time constant circuit 6 (FIG. 2H) is compared by a differential amplifier 19 of the comparison circuit 7 with a reference voltage $V_{C3}$ which is determined by a potentiometer 20, whereby a transmission control signal $x_7$ (FIG. 2I) is produced. The control signal $x_7$ is adapted to selectively enable and disenable the transmission of a wave, such as by on-off controlling a power source associated with the power amplifier 43 or controlling an attenuator which is connected to a stage of the power amplifier 43.

In the particular embodiment shown in FIG. 1, each of the level detectors 8 and 12 is provided with a relatively fast response characteristic, that is, it responds within a relatively short period of time. Although such fast response will be reflected by fast changes of "1" or "0" in the output $x_5$ of the AND gate 5, the time constant circuit 6 effectively removes the fluctuation of the output $x_5$. Since the AND gate 5 shows a fast response at the time of rising, the overall controller circuitry designated 3-7 is capable of rapidly operating when signal reception is started.

Figure 3:
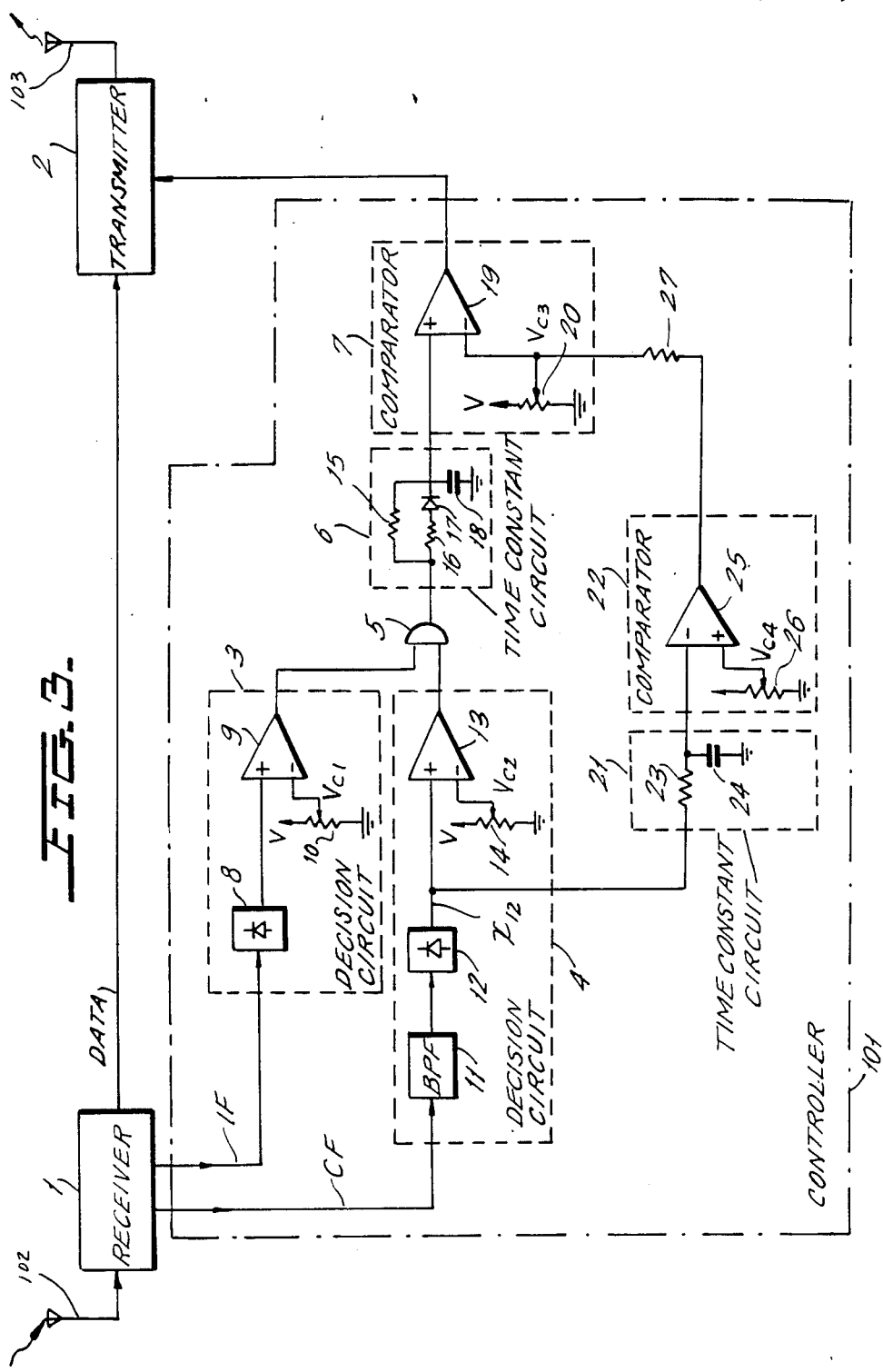
FIG. 3 is a circuit diagram showing another embodiment of the present invention.

Referring to FIG. 3, a digital signal repeater in accordance with another embodiment of the present invention is shown. As shown, the repeater in this particular embodiment is constructed by adding to the repeater of FIG. 1 a time constant circuit 21, a comparison circuit 22, and a resistor 27, so that even more positive operation than in the repeater of FIG. 1 may be accomplished at the time of signal reception. Specifically, in FIG. 3, data indicative of a level of a recovered clock frequency component is picked up from the output $x_{12}$ of the detector 12 and applied to the time constant circuit 21. Comprising a resistor 23 and a capacitor 24, the time constant circuit 21 filters out fluctuations in signal $x_{12}$. The comparison circuit 22 includes a differential amplifier 25 which compares an output of the time constant circuit 21 with a reference voltage $V_{C4}$ which is determined by a potentiometer 26. In this construction, the output of the comparison circuit 22 becomes low level when the recovered clock signal has been determined to be at a sufficient level for a predetermined (comparatively long) period of time. The predetermined time period is a function of the time constant of the time constant circuit 21.

In this manner, the result of decision appearing at the output terminal of the comparator 22 is free from the influence of noise and that of any code pattern and, hence, it can be positively regarded as indicating that the receiver 1 is receiving a digital signal. At this instant, the level of the reference voltage $V_{C3}$ applied to the comparator 7 may be lowered by a suitable value by the output of the comparator 22 via a resistor 27 in order to stably maintain the output of the comparator 7 constant even when the output of the time constant circuit 6 undergoes significant fluctuation due to fading or any other cause.

In summary, it will be seen that the present invention provides a digital signal repeater which is immune to interference due to adjacent channels and the like and, yet, rapidly identifies reception of a digital signal. The repeater, therefore, is desirably applicable to transmission control in a digital signal repeating system.

What is claimed is:
1. A digital signal repeater, comprising:
   (a) a receiver for receiving a modulated carrier wave, converting said received carrier wave into an intermediate frequency signal, and demodulating said intermediate frequency signal to produce a digital signal;
   (b) a transmitter for transmitting a carrier wave modulated by said digital signal; and
   (c) a controller responsive to signals from said receiver and responsive to a reference level for providing a control signal for controlling the transmit- ting operation of said transmitter, said controller including:
(1) first decision means for detecting the level of said intermediate frequency signal of said receiver and providing a first signal in response to such level;
(2) second decision means for detecting whether such signals from the receiver include a clock frequency component and providing a second signal in response to such component;
(3) logic means responsive to the first and second signal for providing a third signal;
(4) first smoothing means for smoothing the third signal; and
(5) comparator means for comparing the output of the first smoothing means with such reference level and providing the control signal as its output.

2. A digital signal repeater as claimed in claim 1, wherein the first smoothing means shows a fast response to a leading portion of the third signal and a slow response to a trailing portion of the third signal.

3. A digital signal repeater as claimed in claim 1, wherein the controller further comprises third decision means for
(a) supplying such above-recited reference level to the comparator means;
(b) detecting when a detected clock frequency component from the receiver has had at least a selected level for at least a selected period of time; and
(c) varying the reference level when it is detected that such detected clock frequency component has had at least such selected level for at least such selected period of time.

4. A digital signal repeater system comprising:
(a) a receiver for receiving an input signal, producing intermediate signals related to such input signal, and producing a demodulated receiver output signal;
(b) a transmitter for transmitting an output signal modulated by such receiver output signal; and
(c) a controller for receiving such intermediate signals from the receiver and in response thereto providing a control signal to control the transmitter, the controller including:
(i) first detection means for processing such intermediate signals and producing a first signal to indicate whether such input signal is present;
(ii) second detection means for processing such intermediate signals to detect whether such signals include a predetermined clock frequency component and producing a second signal to indicate whether such component is present;
(iii) combining means responsive to both such first and second signals to produce a third signal; and
(iv) means for processing such third signal and producing such control signal in response thereto.

5. A system as in claim 4, wherein
such intermediate signals related to such input signal include an IF signal; and
the first detection means includes means for detecting the level of such IF signal and comparing such level to a first reference level.

6. A system as in claim 4, wherein the second detection means includes a bandpass filter for isolating such clock frequency component in such intermediate signals, and means for detecting the level of the bandpass filter output and comparing such level to a second reference level.

7. A system as in claim 4, wherein such first and second signals are logical signals and the combining means is a logical circuit, such third signal indicating thhe presence of both such input signal and such clock frequency component.

8. A system as in claim 7, wherein the means for processing such third signal includes:
(i) smoothing means for smoothing the third signal; and
(ii) comparator means for comparing the output of the first smoothing means to a third reference level, the comparator means producing such control signal as its output.

9. A system as in claim 8, wherein the smoothing means exhibits fast response to rising portions of the third signal and slow response to falling portions of the third signal.

10. A system as in claim 9, wherein
(a) the smoothing means includes a capacitance;
(b) the capacitance is charged by such third signal through a parallel connection of (i) a resistance, and (ii) a resistance in series with diode means, the diode means being conductive substantially only when such third signal is high; and
(c) the input to the comparator means is taken across the capacitor means.

11. A digital signal repeater system comprising:
(a) a receiver for receiving a modulated input signal, producing intermediate signals related to such input signal, and producing a demodulated receiver output signal;
(b) a transmitter for transmitting an output signal modulated by such receiver output signal; and
(c) a controller for receiving such intermediate signals from the receiver and in response thereto providing a control signal to control the transmitter, the controller including:
(i) first detection means for processing such intermediate signals and producing a first signal to indicate whether such input signal is present;
(ii) second detection means for processing such intermediate signals to detect whether such signals include a predetermined clock frequency component and producing a second signal to indicate whether such component is present, the second detection means including bandpass means for isolating such component, means for detecting the level of the bandpass means output, and means for comparing such level to a second detection means reference level, the last-mentioned comparing means producing such second signal as its output;
(iii) combining means responsive to both such first and second signals to produce a third signal; and
(iv) means for processing such third signal and comparing such processed third signal to a third reference signal, the comparing means producing such control signal as its output.

12. A system as in claim 11, wherein the means for processing such third signal includes smoothing means for receiving such third signal and delivering a smoothed output representative of the third signal to the comparing means, such smoothed output being compared to such third reference level.

13. A system as in claim 11, further comprising third detection means for detecting whether the bandpass means output has had substantially at least a selected minimum level for substantially at least a selected period of time, and for providing a fourth signal to indicate whether such conditions exist; such third reference level being supplied at least in part by such fourth signal.

14. A system as in claim 13, wherein the third detection means includes:
(a) a time constant circuit having a capacitance which is charged through a resistance by such bandpass means output level; and
(b) means for comparing a signal across the capacitance to a foruth reference level, and producing such fourth signal in response to such comparison.

15. A digital signal repeater system comprising:
(a) a receiver for receiving an input signal, producing signals related to such input signal, and producing a demodulated receiver output signal;
(b) a transmitter for transmitting an output signal modulated by such receiver output signal; and
(c) a controller for
  (i) receiving such signals related to such input signal from the receiver;
  (ii) processing such signals related to such input signal to detect (1) whether such input signal is present, and (2) whether such signals related to such input signal include a predetermined clock frequency component; and
  (iii) producing a control signal for controlling said transmitter, such control signal being indicative of whether said two conditions are detected.

16. A system as in claim 15, wherein
such signals related to such input signal include an IF signal; and
the controller includes means for detecting the level of such IF signal, comparing such level to a first reference level, and producing a first signal in response to such comparison.

17. A system as in claim 16, wherein the controller includes a bandpass filter for isolating such clock frequency component in such signals related to such input signal; and means for detecting the level of the bandpass filter output, comparing such level to a second reference level, and producing a second signal in response to such comparison.

18. A system as in claim 17, wherein the controller includes means for receiving such first and second signals, and in response producing a third signal indicative of the presence of both such input signal and such clock frequency component.

19. A system as in claim 18, wherein the controller includes means for processing such third signal, comparing such processed third signal to a third reference level, and producing such control signal in response to such comparison.

20. A system as in claim 19, wherein the controller includes timing means for detecting whether the bandpass filter output (a) has had substantially at least a selected minimum level, (b) for substantially at least a selected period of time, and for providing a fourth signal to indicate whether such two conditions exist.

21. A system as in claim 20, wherein such third reference level is supplied at least in part by such fourth signal.

22. A system as in claim 21, wherein said timing means includes:
(a) a time constant circuit which receives such bandpass filter output level and produces an output in response thereto; and
(b) means for comparing such time constant circuit output to a fourth reference level, and producing such fourth signal in response to such comparison.

* * * * *